United States Patent Office.

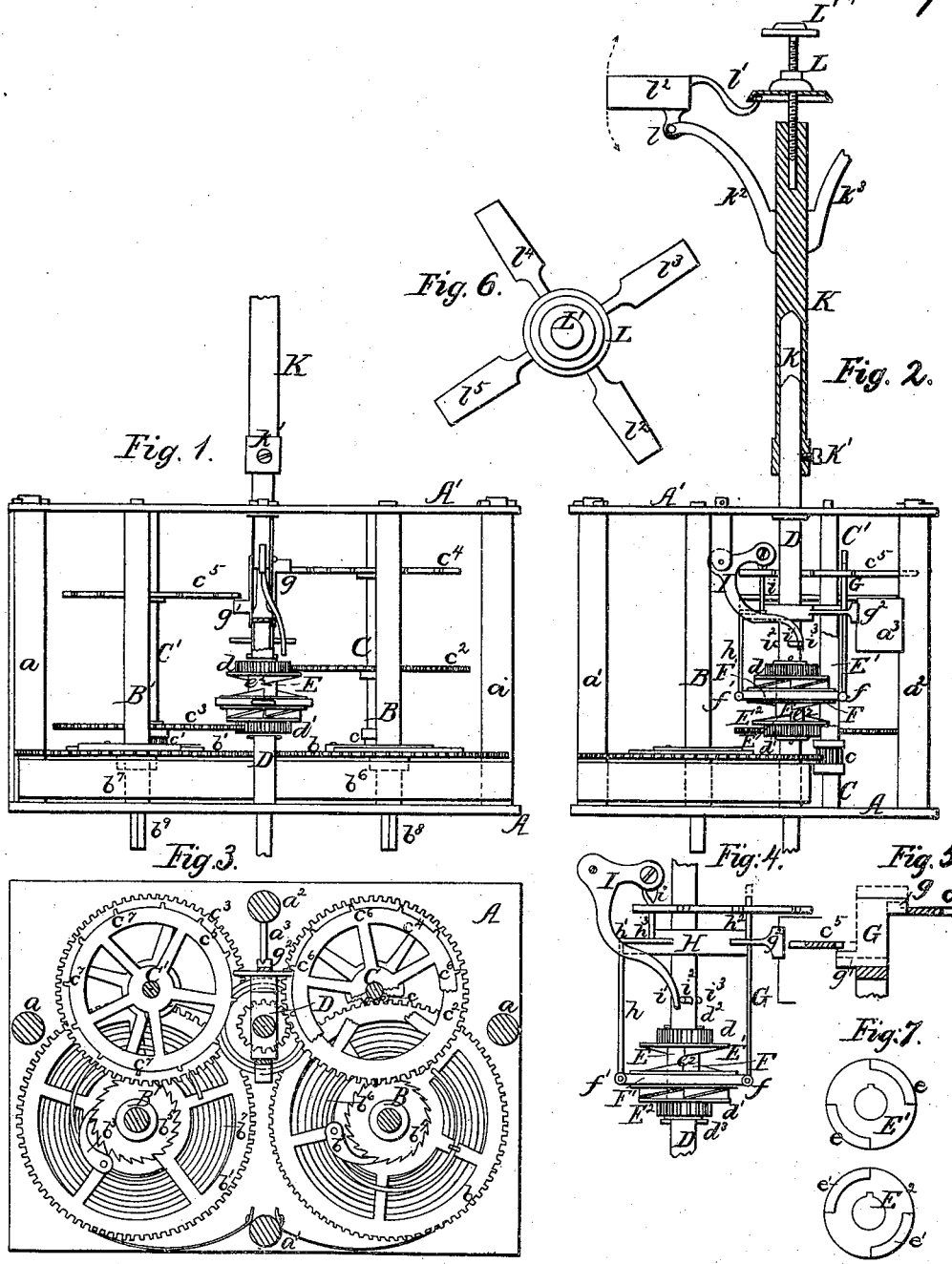

JOHN NAUGLE, OF MOORESVILLE, INDIANA.

Letters Patent No. 88,062, dated March 23, 1869.

IMPROVED AUTOMATIC FAN.

The Schedule referred to in these Letters Patent and making part of the same

*To all whom it may concern:*

Be it known that I, JOHN NAUGLE, of Mooresville, of Morgan county, in the State of Indiana, have invented a new and useful Improvement in Automatic Fans; and I do hereby declare that the following is a full and exact description thereof, reference being had to the accompanying drawings, and letters of reference marked thereon.

The nature of my invention consists in a novel mode of producing an oscillating motion, which is communicated to a spindle, to which a number of fans is radially fastened, in such manner that they may be readily adjusted to any desired inclination with the said spindle, motion being imparted by a right and a left-handed clock-movement.

In the drawings—

Figure 1 represents a front elevation of my machine.

Figure 2 represents a side elevation, showing the fan-head and a longitudinal section of its adjustable socket.

Figure 3 represents a top view, the top being removed, to expose the inner mechanism.

Figure 4 represents a detached view of the reverse-gearing.

Figure 5 represents the parts by which the sway of the oscillations is regulated.

Figure 6 is a top view of the fan-head.

Figure 7 is a top view of the driving-clutches, shown in elevation in figs. 1, 2, 4.

Corresponding letters represent corresponding parts in the several figures.

To enable others skilled in the art to make and use my invention, I will proceed to describe its construction and operation.

My machine consists of a mechanism for right and left-handed motion, a reverse-gearing and adjusting-arrangement, hereafter to be described, all enclosed in a frame, which is made of two plates, A A', connected by a number of studs, $a$ $a$ $a^1$ $a^2$, secured together in the same manner as a clock-frame.

Between these plates are a spindle, B, with a gear-wheel, $b$, pawl $b^2$, and ratchet-wheel $b^4$, and a spindle, B', with gear-wheel $b^1$, pawl $b^3$, and ratchet-wheel $b^5$.

A spring, $b^7$, attached to wheel $b^4$, imparts left-handed motion to it, and also to wheel $b^1$.

A spring, $b^6$, attached to wheel $b^5$, imparts right-handed motion to it, and also to wheel $b$.

A square head, $b^8$, on shaft B, and a square head, $b^9$, on shaft B', are for the purpose of winding up.

The driving-wheel $b$ gears into a pinion, $c$, on a shaft, C, and to this shaft are attached a gear-wheel, $c^2$, and a stop-wheel, $c^4$, which latter is provided with a number of projections, $c^6$, at its periphery.

In the same manner, the shaft C' has a pinion, $c^1$, a gear-wheel, $c^3$, and a stop-wheel, $c^5$, with projections $c^7$, of the same size and construction as the corresponding parts on shaft C, the only difference being that wheels $c^3$ and $c^5$ are fastened at lower levels to their respective shafts than wheels $c^2$ and $c^4$.

The wheel $c^2$ gears into a pinion, $d$, which is loose on a shaft, D, and is prevented from sliding up and down by a pin, $d^2$, above it, and a clutch-arrangement below.

Likewise, wheel $c^3$ gears into a pinion, $d^1$, on shaft D, which may freely turn around, but is kept in position by a pin, $d^3$, below, and the clutch-arrangement above.

The clutch-arrangement consists of two clutch-plates, $E^1$ and $E^2$, and a tube, E, between them, which tube is fastened to the shaft D, and provided with a rib, or feather, $e^2$.

A double clutch-plate, F, is so fitted on the tube E that it may slide up and down on it. The clutch $E^1$ is fastened to the pinion $d$, and the clutch $E^2$ is fastened to the pinion $d^1$.

In fig. 2, the double clutch F is represented in gear with the upper clutch, $E^1$, and, in fig. 4, it is represented in gear with the lower clutch, $E^2$. In the first case, the shaft D receives motion from wheel $b$, which is a right-handed one, and, in the latter case, the motion is received from wheel $b^1$, and is a left-handed one.

The pinion $d^1$, with its disengaged clutch $E^2$, as seen in fig. 2, would revolve with great rapidity and loss of power were it not for a double sliding check, G, which, with one of its projecting laps $g$, stops the further progress of one of the projections $c^6$ on wheel $c^4$, thereby stopping the whole right-handed movement.

A lap, $g^1$, on the other side of the check G, is, at the same time, below the level of wheel $c^5$, whereby one of its projections, $c^7$, is permitted to pass, which causes the shaft D to be revolved toward the left-hand from the wheel $b^1$.

Fig. 5 represents the check G in full, and the stop wheels $c^4$ $c^5$ in section, in such position as to cause a left-handed motion, or revolution of shaft D.

To make the check G slide up and down, I couple it with the sliding clutch, F, by means of a strap, F', which encircles an annular groove on said clutch.

The one joint $f$ of the strap F' is fastened to the end of the check G, while the other joint, $f'$, is fastened to a connecting-bar, $h$, which is again fastened to a sliding head, H, at $h^1$.

The check G is also fastened to the head, H, at $h^2$, and a connecting-bar, $h^3$, fastened to H, and jointed to the short arm of an elbow-lever, I, transmits a vertical motion to the head, H.

The longer arm of lever I receives its motion, at its end, $i^1$, from two pins $i^2$ and $i^3$, which are fastened to the shaft D, and strike and move the said lever-arm alternately, according to the oscillations of the shaft.

As the head, H, strap F', and check G, are rigidly connected, and as a forked bearing, $g^2$, fastened to the check G, and sliding on a vertical guide, $a^3$, projecting from stud $a^2$, permits a vertical motion, it is evident that the motion of the three parts H F' G combined, is only a vertical one, while F, partaking of the same motion, is also permitted to oscillate in the encircling strap.

It is understood that the sliding clutch is alternately changing its motion as it is either moved up or down and brought in contact with clutch $E^1$ or with clutch $E^2$.

The shaft D projects through the upper plate, A', of the frame-work, and another shaft, K, supporting a fan-head, is fitted with its socket-end $k$ to this projection, to which it may be fastened, at any height, by a set-screw, $k^1$, as represented in section in fig. 2.

The fan-head consists of a number of arms, fastened to shaft K, by which the fan-sockets are supported. There are four such arms, two of which are only seen in the drawing, $k^2$ and $k^3$.

The connection of the arms and fan-sockets is shown in fig. 2, in which one arm, $k^2$, is shown supporting, with a joint, $l$, a socket, $l^2$, with a rod, $l^1$, fastened to it.

As the socket is overbalanced at its outward end, the rod $l^1$ is pressed against the lower part of a pressure-head, L, which is kept in position by a set-screw, L', screwing into the top of shaft K.

If I screw L' down, the head, L, partaking of the same motion, depresses the rod, $l^1$, and thereby tilts the socket $l^2$, and lifts the fan, which may be inserted in the socket, and *vice versa*. This may be done to any desired height, owing to the peculiar shape of rod $l^1$. It can also be done while the machine is in operation.

The fans, or brushes to be inserted in the sockets $l^2$ $l^3$ $l^4$ $l^5$, may be of any known construction, size, or material, and, as they are movable, I may, at convenience, use one, two, three, or four fans at the same time.

The machine makes a half revolution at each stroke. I prefer a quarter revolution, as suitable for the greatest variety of purposes. If it is desirable to have a machine with adjustable stroke for any fraction of a revolution, the projections $c^6$, on wheel $c^4$, and $c^7$, on wheel $c^5$, may be made removable, and thus fasten a larger or smaller number of them to the wheels $c^4$ and $c^5$. A collar, with adjustable projections, on shaft D, may be substituted for the pins $i^2$ $i^3$.

The machine is mounted on a stand, and may be put on a table or any piece of furniture.

With the aid of a detachable bracket and an adjustable hinged platform, I am able to operate my machine at any imaginable position.

A small stopping-arrangement may be attached, by which the machine may be started or stopped at pleasure after it is wound up.

Having thus clearly and fully described the construction of my machine, I proceed to describe the operation of it.

After winding up the springs $b^6$ and $b^7$, the wheel $c^5$, being disengaged from the check G, moves the shaft D to the left until the pin $i^3$ strikes the lever-end $i^1$, and thereby lifts the clutch F, disconnects it from the clutch $E^2$, and connects it with the clutch $E^1$, which causes the reversal of the motion of shaft D. At the same time, one of the stops $c^7$ has arrived at the projection $g^1$ on check G, which was lifted simultaneously with F, and is arrested in its motion. By the same-mentioned lift, one of the projections, $c^6$, on wheel $c^4$, which heretofore was stopped by the projection $g$ on the check G, is now freed from its impediment, and, as a consequence, shaft D is driven to the right, whereby one oscillation is finished.

Having thus clearly and fully described the construction and operation of my machine,

I claim—

1. The sliding clutch F, in connection with the pinions $d$ $d'$, clutches $E^1$ $E^2$, check G, stop-wheels $c^4$ $c^5$, rib $e^2$, lever I, pins $i^2$ $i^3$, and shaft D, constructed and operated in the manner and for the purpose set forth.

2. The connection of the adjustable socket $l^2$ with rod $l^1$, head L, and set-screw L', supported and moved by shaft D, as and for the purpose described.

JOHN NAUGLE.

Witnesses:
J. SNOWDEN BELL,
J. P. THEODORE LANG.